United States Patent
Chandler

(10) Patent No.: US 10,641,124 B2
(45) Date of Patent: May 5, 2020

(54) HYBRID ELECTRIC TURBINE ENGINE

(71) Applicant: United Technologies Corporation, Farmington, CT (US)

(72) Inventor: Jesse M. Chandler, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 46 days.

(21) Appl. No.: 15/997,879

(22) Filed: Jun. 5, 2018

(65) Prior Publication Data

US 2019/0368370 A1    Dec. 5, 2019

(51) Int. Cl.
    *F01D 15/10*     (2006.01)
    *F02C 6/00*     (2006.01)
    *F01D 15/12*     (2006.01)
    *F02C 7/36*     (2006.01)

(52) U.S. Cl.
CPC .......... *F01D 15/10* (2013.01); *F01D 15/12* (2013.01); *F02C 7/36* (2013.01); *F05D 2260/20* (2013.01); *F05D 2260/53* (2013.01)

(58) Field of Classification Search
CPC ............ F01D 15/10; F01D 15/12; F02C 7/26
See application file for complete search history.

(56) References Cited

U.S. PATENT DOCUMENTS

| | | | | |
|---|---|---|---|---|
| 4,118,997 | A * | 10/1978 | Woodward | F01D 15/12 74/417 |
| 6,657,332 | B2 * | 12/2003 | Balas | F02C 7/08 310/58 |
| 8,141,360 | B1 * | 3/2012 | Huber | B60K 6/24 60/606 |
| 9,828,911 | B2 | 11/2017 | Burghardt | |
| 9,878,796 | B2 * | 1/2018 | Sheridan | F02C 7/36 |
| 2006/0185346 | A1 * | 8/2006 | Rolt | F02K 3/06 60/224 |
| 2009/0056309 | A1 * | 3/2009 | Roberge | F02C 3/113 60/263 |
| 2010/0000226 | A1 * | 1/2010 | Rensch | F01D 15/10 60/784 |
| 2010/0054944 | A1 * | 3/2010 | Fledersbacher | F01D 5/025 416/204 A |
| 2010/0219779 | A1 * | 9/2010 | Bradbrook | F02C 3/113 318/153 |
| 2015/0013307 | A1 | 1/2015 | Burghardt | |
| 2015/0084340 | A1 * | 3/2015 | Kuczaj | F01D 15/10 290/52 |
| 2015/0211416 | A1 * | 7/2015 | Chandler | F02K 3/068 60/39.15 |
| 2015/0247456 | A1 * | 9/2015 | Suciu | F02C 3/14 60/791 |

(Continued)

*Primary Examiner* — Tulsidas C Patel
*Assistant Examiner* — Thomas K Quigley
(74) *Attorney, Agent, or Firm* — Cantor Colburn LLP

(57) ABSTRACT

A hybrid electric gas turbine engine includes a fan section, a turbine section, a first gas generating core, and a generator assembly. The fan section has a fan. The turbine section has a turbine drivably connected to the fan through a main shaft that extends along a central longitudinal axis. The first gas generating core extends along a first axis that is radially offset from the central longitudinal axis. The generator assembly is drivably connected to the main shaft through a gear assembly.

19 Claims, 4 Drawing Sheets

(56) References Cited

U.S. PATENT DOCUMENTS

| | | | |
|---|---|---|---|
| 2016/0097328 A1* | 4/2016 | Wintgens | F02C 7/32 |
| | | | 415/1 |
| 2017/0248079 A1* | 8/2017 | Hoefler | F02C 7/185 |
| 2018/0298817 A1* | 10/2018 | Kalya | F04D 27/009 |
| 2019/0137104 A1* | 5/2019 | Jain | F23R 3/286 |
| 2019/0277199 A1* | 9/2019 | Fauvet | F02C 3/06 |

* cited by examiner

HYBRID ELECTRIC TURBINE ENGINE

BACKGROUND

Exemplary embodiments of the present disclosure pertain to the art of hybrid electric gas turbine engines.

A gas turbine engine typically includes a fan section driven by a core engine or gas generating core arranged along a common axis. The core engine includes a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section through a driven shaft.

BRIEF DESCRIPTION

Disclosed is a hybrid electric gas turbine engine that includes a fan section, a turbine section, a first gas generating core, and a generator assembly. The fan section has a fan. The turbine section has a turbine drivably connected to the fan through a main shaft that extends along a central longitudinal axis. The first gas generating core extends along a first axis that is radially offset from the central longitudinal axis. The generator assembly is drivably connected to the main shaft through a gear assembly.

In addition to one or more of the features described above, or as an alternative to any of the foregoing embodiments, the generator assembly includes an electric motor having a shaft extending along an electric motor axis and an electric motor gear disposed at an end of the shaft.

In addition to one or more of the features described above, or as an alternative to any of the foregoing embodiments, the electric motor axis is radially offset from at least one of the central longitudinal axis and the first axis.

In addition to one or more of the features described above, or as an alternative to any of the foregoing embodiments, the gear assembly includes a main gear disposed about the main shaft; and a gear shaft assembly having a gear shaft extending along a gear shaft axis, a first gear disposed at a first end of the gear shaft, and a second gear disposed at a second end of the gear shaft.

In addition to one or more of the features described above, or as an alternative to any of the foregoing embodiments, the gear shaft axis is disposed in a nonparallel relationship with at least one of the electric motor axis and the central longitudinal axis.

In addition to one or more of the features described above, or as an alternative to any of the foregoing embodiments, the first gear is in meshed engagement with the main gear and the second gear is in meshed engagement with the electric motor gear.

In addition to one or more of the features described above, or as an alternative to any of the foregoing embodiments, a second gas generating core extending along a second axis that is radially offset from the central longitudinal axis.

In addition to one or more of the features described above, or as an alternative to any of the foregoing embodiments, the second gas generating core is radially offset from the first gas generating core.

Also disclosed is a hybrid electric gas turbine engine that includes a fan section, a turbine section, a first gas generating core, and a generator assembly. The fan section has a fan and a guide vane extending from a static structure. The turbine section has an exit housing and a turbine drivably connected to the fan through a main shaft that extends along a central longitudinal axis. The first gas generating core extends along a first axis that is radially offset from the central longitudinal axis. The generator assembly is drivably connected to the main shaft through a gear assembly. The generator assembly is circumferentially offset from the first gas generating core.

In addition to one or more of the features described above, or as an alternative to any of the foregoing embodiments, a support structure extends between and operatively connects the static structure and the exit housing.

In addition to one or more of the features described above, or as an alternative to any of the foregoing embodiments, a sleeve is disposed about the main shaft.

In addition to one or more of the features described above, or as an alternative to any of the foregoing embodiments, the sleeve defines an opening that is arranged to receive air from the fan to cool the main shaft.

In addition to one or more of the features described above, or as an alternative to any of the foregoing embodiments, a second gas generating core extending along a second axis that is radially offset from the central longitudinal axis.

In addition to one or more of the features described above, or as an alternative to any of the foregoing embodiments, the generator assembly is circumferentially disposed between the first gas generating core and the second gas generating core.

In addition to one or more of the features described above, or as an alternative to any of the foregoing embodiments, a shroud extends from the static structure towards the turbine. The shroud is disposed about at least a portion of at least one of the generator assembly, the first gas generating core, and the second gas generating core.

In addition to one or more of the features described above, or as an alternative to any of the foregoing embodiments, an exhaust duct includes a first rear duct that extends from an end of the first gas generating core towards the turbine and a second rear duct that extends from an end of the second gas generating core towards the turbine.

In addition to one or more of the features described above, or as an alternative to any of the foregoing embodiments, the first rear duct and the second rear duct merge into a turbine housing that is disposed about the turbine.

In addition to one or more of the features described above, or as an alternative to any of the foregoing embodiments, the generator assembly includes an electric motor having a shaft and an electric motor gear disposed at an end of the shaft.

In addition to one or more of the features described above, or as an alternative to any of the foregoing embodiments, a main gear disposed about the main shaft and disposed proximate the static structure; and a gear shaft assembly having a gear shaft, a first gear disposed at a first end of the gear shaft, and a second gear disposed at a second end of the gear shaft.

In addition to one or more of the features described above, or as an alternative to any of the foregoing embodiments, the first gear is in meshed engagement with the main gear and the second gear is in meshed engagement with the electric motor gear.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus are presented herein by way of exemplification and not limitation with reference to the Figures.

Figure 1:
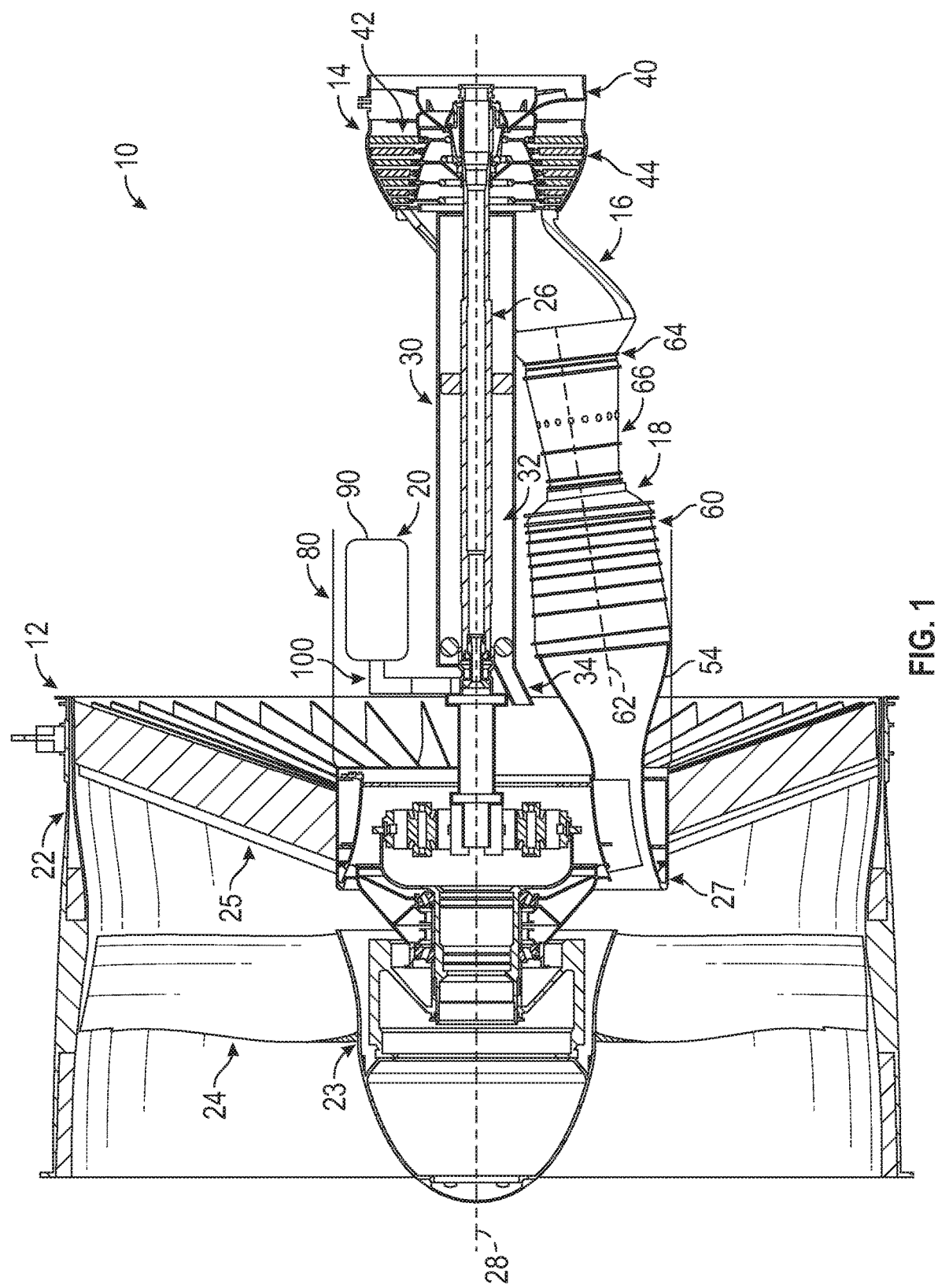
FIG. 1 is a partial cross-sectional view of a hybrid electric gas turbine engine.

FIG. 1 schematically illustrates a hybrid electric gas turbine engine 10. The hybrid electric gas turbine engine 10 includes a fan section 12, a turbine section 14, an exhaust duct 16, at least one gas generating core 18, and a generator assembly 20.

The fan section 12 includes a fan case 22 that receives a fan 24 that extends from a rotating hub 23 and fan guide vanes 25 that extend from a static structure such as an inlet case 27. The rotating hub 23 and the fan 24 are driven by a fan shaft or a main shaft 26 (e.g. low speed spool) that extends between the fan section 12 and the turbine section 14 along a central longitudinal axis 28. The main shaft 26 extends through the inlet case 27 to rotate the fan 24 and the hub 23 about the central longitudinal axis 28.

As shown in FIG. 1, a jacket, a shroud, or a sleeve 30 may be disposed about the main shaft 26 and extend between the fan section 12 and the turbine section 14 along the central longitudinal axis 28. The sleeve 30 may be at least partially spaced apart from the main shaft 26 such that an internal volume 32 is defined between an interior surface of the sleeve 30 and an exterior surface of the main shaft 26. The sleeve 30 defines at least one opening, a plurality of openings, or an inlet duct 34 that is fluidly connected to the internal volume 32 of the sleeve 30. The at least one opening, the plurality of openings, or the inlet duct 34 are arranged to receive air from the fan 24 and direct the air into the internal volume 32 of the sleeve 30 to cool the main shaft 26. In at least one embodiment, air from the compressor of a gas generating core may be piped to a case of the gas generating core to cool the turbine housing 44 in addition to or instead of cooling the main shaft 26.

Referring to FIGS. 1-4, the turbine section 14 is disposed axially downstream of the fan section 12 along the central longitudinal axis 28. The turbine section 14 includes an exit housing 40 and a turbine 42. The exit housing 40 and the turbine 42 are operatively and/or fluidly connected to at least one gas generating core 18. A turbine housing 44 is arranged to receive a fluid flow from at least one gas generating core 18 to rotate the turbine 42. The turbine 42 is rotatably disposed within the turbine housing 44 that is operatively connected to the exit housing 40. The turbine 42 is drivably connected to the fan 24 through the main shaft 26.

Figure 4:
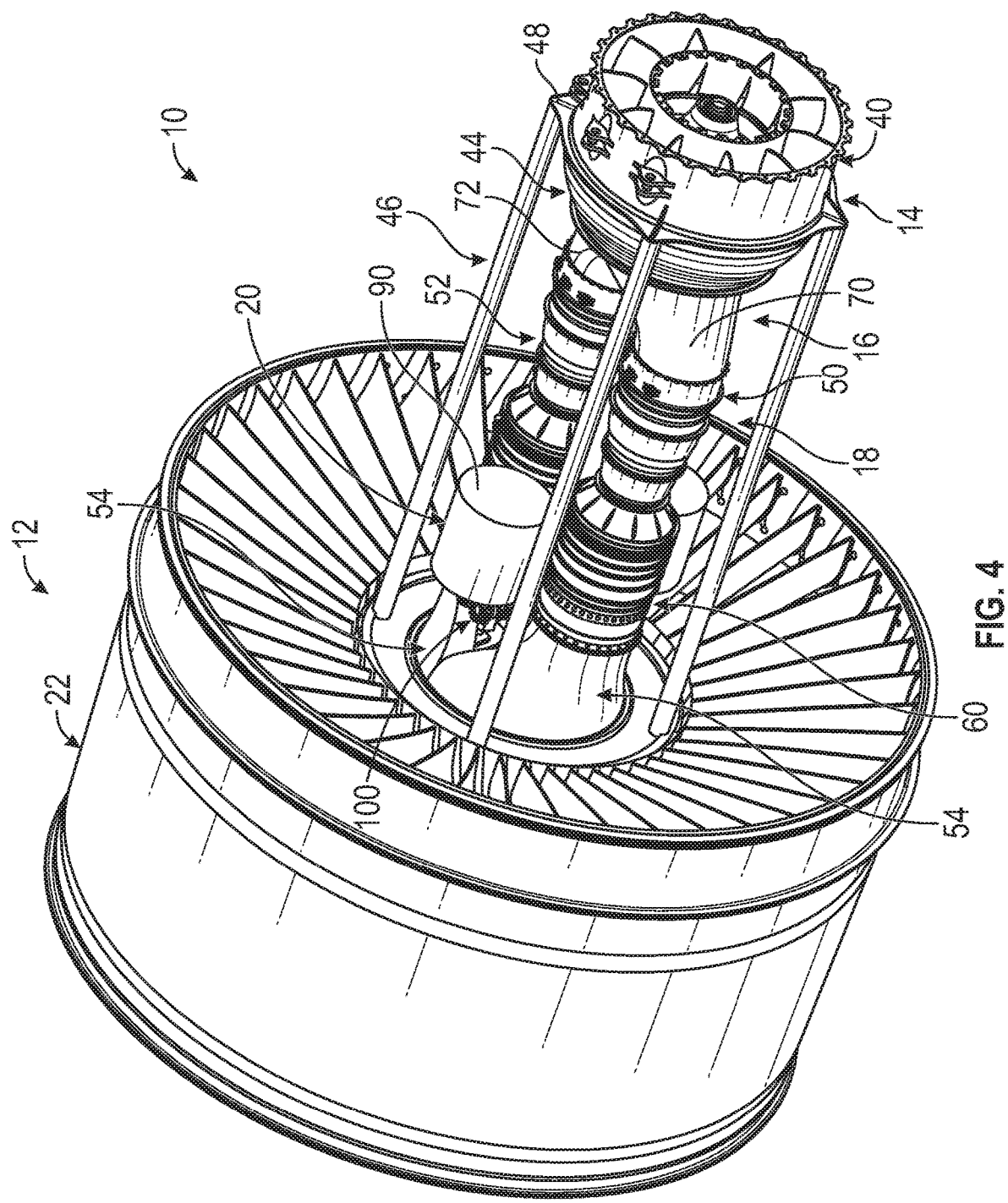
FIG. 4 is a perspective view of the hybrid electric gas turbine engine.

As shown in FIG. 4, a support structure 46 extends between and operatively connects the static structure (e.g. inlet case 27) of the fan section 12 and the exit housing 40, as shown in FIG. 4. In such an embodiment, a mounting flange 48 radially extends from the exit housing 40. The support structure 46 is operably connected to the mounting flange 48. Additional support structures, such as structural beams or cross-beams may be provided to add stiffness.

Figure 2:
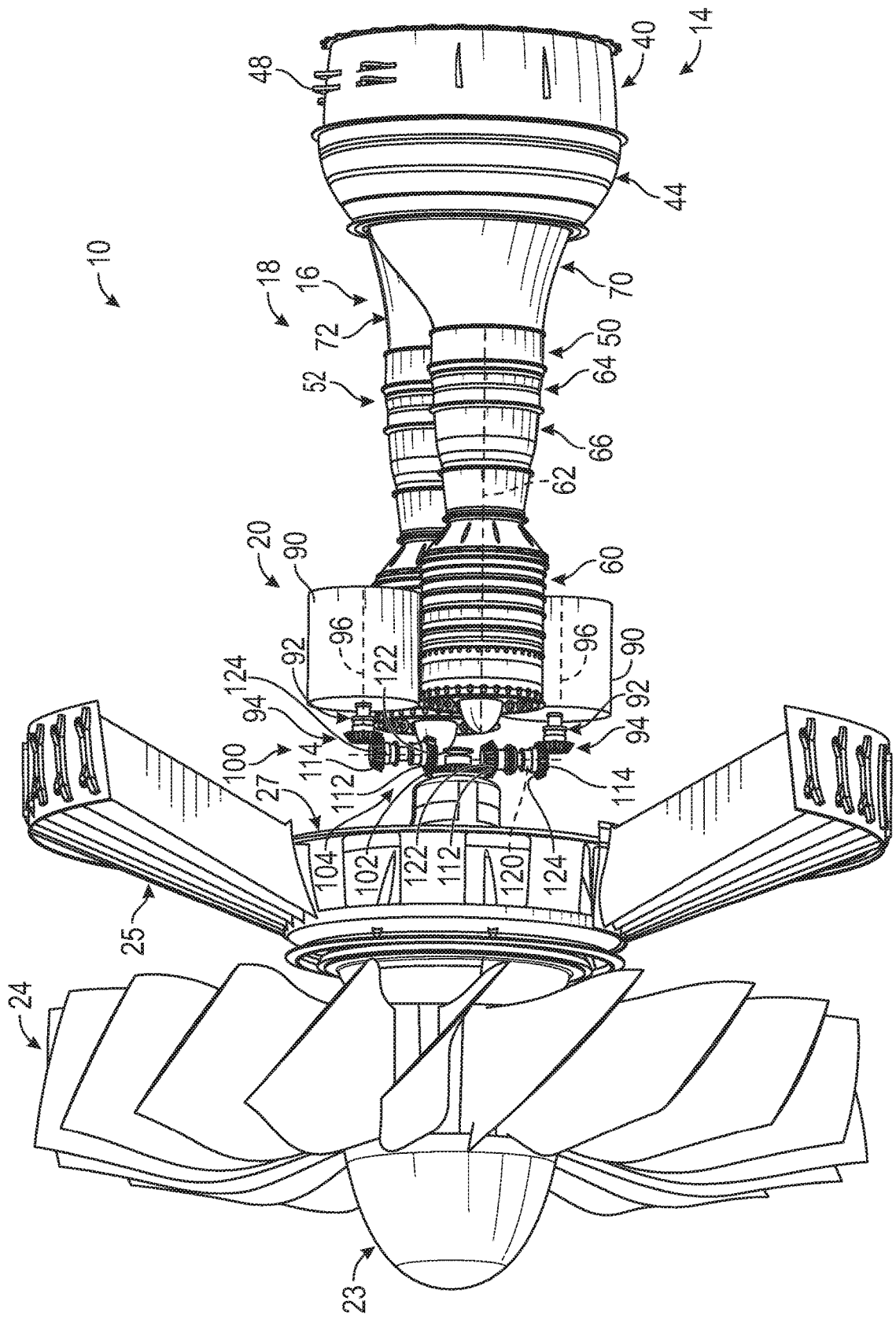
FIG. 2 is a partial cut away view of the hybrid electric gas turbine engine.
Figure 3:
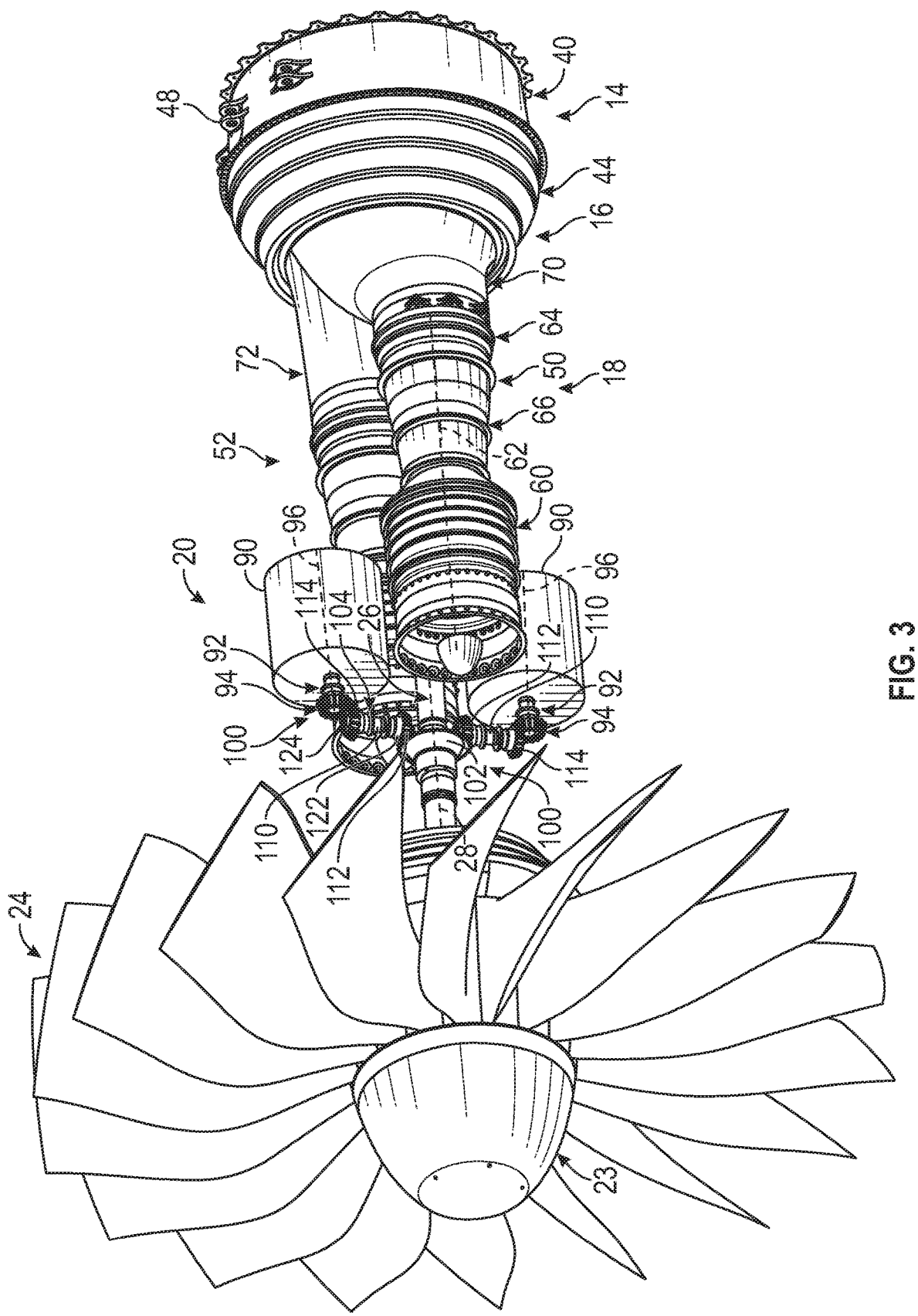
FIG. 3 is a perspective view of the hybrid electric gas turbine engine.

At least one gas generating core 18 may include a first core engine or first gas generating core 50 and a second core engine or second gas generating core 52 (as shown in FIGS. 2-4) that are each radially offset from the central longitudinal axis 28. In other embodiments, additional or fewer gas generating cores may be provided. The first gas generating core 50 and the second gas generating core 52 are axially disposed between the fan section 12 and the turbine section 14, with respect to the central longitudinal axis 28.

The first gas generating core 50 and/or the second gas generating core 52 may each be a single spool gas generator, a dual spool gas generator, or a multi-spool gas generator. The first gas generating core 50 and the second gas generating core 52 are positioned to receive air from the fan 24 and drive the turbine 42 that in turn drives the fan 24. The first gas generating core 50 and the second gas generating core 52 may have a substantially similar configuration, therefore substantially similar components will be given the same reference numerals.

The fan 24 delivers air into the fan case 22 and a portion of the air passes through an inlet duct 54 of the first gas generating core 50 and/or the second gas generating core 52 and into the first gas generating core 50 and/or the second gas generating core 52. The first gas generating core 50 and the second gas generating core 52 each include a compressor section 60 driven by a shaft that extends along an axis 62 that is disposed in a non-parallel relationship with the central longitudinal axis 28. The shaft is in turn, driven by a turbine section 64 that drives the compressor section 60. A combustor section 66 is positioned between the compressor section 60 and the turbine section 64.

The exhaust duct 16 extends from the turbine section 64 of the first gas generating core 50 and/or the second gas generating core 52 towards the turbine section 14. The products of combustion, from the turbine section 64 of the first gas generating core 50 and/or the second gas generating core 52, pass through the exhaust duct 16 and across the turbine 42, which rotates about the central longitudinal axis 28 to, in turn, rotate the main shaft 26 and the fan 24.

The exhaust duct 16 extends from an end of the turbine section 64 of each of the first gas generating core 50 and the second gas generating core 52 to fluidly connect the first gas generating core 50 and the second gas generating core 52 to the turbine section 14.

Referring to FIGS. 2-4, the exhaust duct 16 includes a first rear duct 70 and a second rear duct 72. The first rear duct 70 extends from an end of the turbine section 64 of the first gas generating core 50 towards the free turbine 42 and the exit housing 40. The first rear duct 70 extends to the turbine housing 44. The second rear duct 72 extends from an end of the turbine section 64 of the second gas generating core 52 towards the free turbine 42 and the turbine housing 44. The second rear duct 72 and the first rear duct 70 merge into the turbine housing 44 to deliver combustion gases to the free turbine 42 to drive the free turbine 42 that in turn drives the upstream fan 24 through the main shaft 26.

The first gas generating core 50 and the second gas generating core 52 each extend about or extend along the axis 62 is offset, or angularly skewed, relative to the central longitudinal axis 28 of the main shaft 26 such that the first gas generating core 50 and the second gas generating core 52 are radially offset, angularly skewed, or disposed in a non-parallel relationship relative to the central longitudinal axis 28 of the main shaft 26.

The offset gas generating core architecture enables the use of a much smaller gas generating core(s). The first gas generating core 50 and the second gas generating core 52 may be much smaller than traditional gas turbine engine cores because the first gas generating core 50 and the second gas generating core 52 are not built around the main shaft 26 that drives the fan. Efficiency of the hybrid electric gas turbine engine 10 may be improved by reducing the size of the high speed spool, reducing the size of the shaft within the first gas generating core 50 and/or the second gas generating core 52, and operating the first gas generating core 50 and/or the second gas generating core 52 at an elevated high overall pressure ratio.

The reduced size of the first gas generating core 50 and/or the second gas generating core 52 enables the integration of the generator assembly 20 within the footprint of the inlet case 27 of the fan section 12. As shown in FIG. 1, a shroud 80 is disposed about at least a portion of the first gas generating core 50, the second gas generating core 52, and the generator assembly 20. The shroud 80 axially extends, relative to the central longitudinal axis 28, from the static structure (e.g. the inlet case 27) towards the turbine 42 of the turbine section 14. The shroud 80 may at least partially define the footprint of the inlet case 27 of the fan section 12.

The generator assembly 20 is circumferentially disposed between the first gas generating core 50 and the second gas generating core 52. In additional embodiments, an additional generator assembly may be provided that is circumferentially spaced apart from the generator assembly 20 and is circumferentially disposed between the first gas generating core 50 and the second gas generating core 52 or may be remotely located.

The generator assembly 20 includes an electric machine, a motor-generator, or an electric motor 90 having a shaft 92 and an electric motor gear 94. The shaft 92 extends from the electric motor 90 along an electric motor axis 96. The electric motor axis 96 is radially offset from at least one of the central longitudinal axis 28 and the axis 62 along which at least one of the first gas generating core 50 and/or the second gas generating core 52. The electric motor gear 94 is disposed at an end of the shaft 92. The electric motor gear 94 of the electric motor 90 drivably connects the generator assembly 20 to the main shaft 26 through a gear assembly 100 such that the electric motor 90 may be driven by the main shaft 26 and/or the electric motor 90 may drive the hybrid electric gas turbine engine 10.

The gear assembly 100 may be provided with a gearbox that is integrated onto the main shaft 26. Both the gear assembly 100 and the electric motor 90 may be tied to the gearbox to provide and receive power for the hybrid electric gas turbine engine 10. The gear assembly 100 may employ a series of bevel gears or the like to enable the transfer of rotary motion from the main shaft 26 to the generator assembly 20 and vice versa.

The gear assembly 100 includes a main gear 102 and a gear shaft assembly 104. The main gear 102 is disposed about the main shaft 26 and is disposed proximate or may abut the static structure of the fan section 12.

The gear shaft assembly 104 extends between the main gear 102 and the electric motor gear 94, providing the connection between the electric motor 90 of the generator assembly 20 and the main shaft 26. The gear shaft assembly 104 includes a gear shaft 110, a first gear 112, and a second gear 114.

The gear shaft 110 extends along a gear shaft axis 120 between a first end 122 and a second end 124. The gear shaft axis 120 is disposed in a nonparallel relationship with at least one of the electric motor axis 96 and the central longitudinal axis 28. In at least one embodiment, the gear shaft axis 120 is disposed transverse to at least one of the electric motor axis 96 and the central longitudinal axis 28.

The first gear 112 is disposed at the first end 122 of the gear shaft 110. The first gear 112 is in meshed engagement with the main gear 102.

The second gear 114 is disposed at the second end 124 of the gear shaft 110. The second gear 114 is in meshed engagement with the electric motor gear 94.

The hybrid electric gas turbine engine 10 of the present disclosure may also be beneficial and engine applications that do not involve an electric motor, but may employ the gear assembly 100 to allow power transfer from the main shaft 26 to other components.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid electric gas turbine engine, comprising:
   a fan section having a fan;
   a turbine section having a turbine drivably connected to the fan through a main shaft that extends along a central longitudinal axis;
   a first gas generating core extending along a first axis that is radially offset from the central longitudinal axis;
   a generator assembly drivably connected to the main shaft through a gear assembly;
   a shroud extending from an inlet case of the fan section towards the turbine, the shroud being disposed about the first gas generating core and the generator assembly such that the first gas generating core and the generator assembly are located between the central longitudinal axis and the shroud.

2. The hybrid electric gas turbine engine of claim 1, wherein the generator assembly includes a motor-generator having a shaft extending along an electric motor axis and an electric motor gear disposed at an end of the shaft.

3. The hybrid electric gas turbine engine of claim 2, wherein the electric motor axis is radially offset from at least one of the central longitudinal axis and the first axis.

4. The hybrid electric gas turbine engine of claim 2, wherein the gear assembly includes:
   a main gear disposed about the main shaft; and a gear shaft assembly having a gear shaft extending along a gear shaft axis, a first gear disposed at a first end of the gear shaft, and a second gear disposed at a second end of the gear shaft.

5. The hybrid electric gas turbine engine of claim 4, wherein the gear shaft axis is disposed in a nonparallel relationship with at least one of the electric motor axis and the central longitudinal axis.

6. The hybrid electric gas turbine engine of claim 4, wherein the first gear is in meshed engagement with the main gear and the second gear is in meshed engagement with the electric motor gear.

7. The hybrid electric gas turbine engine of claim 4, further comprising:
a second gas generating core extending along a second axis that is radially offset from the central longitudinal axis, the second gas generating core being located between the central longitudinal axis and the shroud.

8. The hybrid electric gas turbine engine of claim 7, wherein the second gas generating core is radially offset from the first gas generating core.

9. A hybrid electric gas turbine engine, comprising:
a fan section having a fan and a guide vane extending from a static structure;
a turbine section having an exit housing and a turbine drivably connected to the fan through a main shaft that extends along a central longitudinal axis;
a first gas generating core extending along a first axis that is radially offset from the central longitudinal axis;
a generator assembly drivably connected to the main shaft through a gear assembly, the generator assembly being circumferentially offset from the first gas generating core; and
a shroud extending from the static structure towards the turbine, the shroud being disposed about the first gas generating core and the generator assembly such that the first gas generating core and the generator assembly are located between the central longitudinal axis and the shroud.

10. The hybrid electric gas turbine engine of claim 9, further comprising a support structure extends between and operatively connects the static structure and the exit housing.

11. The hybrid electric gas turbine engine of claim 9, further comprising a sleeve is disposed about the main shaft.

12. The hybrid electric gas turbine engine of claim 11, wherein the sleeve defines an opening that is arranged to receive air from the fan to cool the main shaft.

13. The hybrid electric gas turbine engine of claim 9, further comprising a second gas generating core extending along a second axis that is radially offset from the central longitudinal axis, the second gas generating core being located between the central longitudinal axis and the shroud.

14. The hybrid electric gas turbine engine of claim 13, wherein the generator assembly is circumferentially disposed between the first gas generating core and the second gas generating core.

15. The hybrid electric gas turbine engine of claim 13, further comprising:
an exhaust duct that includes a first rear duct that extends from an end of the first gas generating core towards the turbine and a second rear duct that extends from an end of the second gas generating core towards the turbine.

16. The hybrid electric gas turbine engine of claim 15, wherein the first rear duct and the second rear duct merge into a turbine housing that is disposed about the turbine.

17. The hybrid electric gas turbine engine of claim 9, wherein the generator assembly includes a motor-generator having a shaft and an electric motor gear disposed at an end of the shaft.

18. The hybrid electric gas turbine engine of claim 17, wherein the gear assembly includes:
a main gear disposed about the main shaft and disposed proximate the static structure; and
a gear shaft assembly having a gear shaft, a first gear disposed at a first end of the gear shaft, and a second gear disposed at a second end of the gear shaft.

19. The hybrid electric gas turbine engine of claim 18, wherein the first gear is in meshed engagement with the main gear and the second gear is in meshed engagement with the electric motor gear.

* * * * *